(12) United States Patent
Harris

(10) Patent No.: US 12,015,168 B2
(45) Date of Patent: Jun. 18, 2024

(54) ELECTRIC TERMINALS WITH CONCENTRIC SPRINGS

(71) Applicant: POWER.GLOBAL, PBC, Pasadena, CA (US)

(72) Inventor: W. Porter Harris, Pasadena, CA (US)

(73) Assignee: POWER.GLOBAL, PBC, Pasadena, CA (US)

( * ) Notice: Subject to any disclaimer, the term of this patent is extended or adjusted under 35 U.S.C. 154(b) by 218 days.

(21) Appl. No.: 17/696,592

(22) Filed: Mar. 16, 2022

(65) Prior Publication Data

US 2022/0302561 A1 Sep. 22, 2022

Related U.S. Application Data

(60) Provisional application No. 63/162,414, filed on Mar. 17, 2021.

(51) Int. Cl.
*H01M 50/30* (2021.01)
*H01M 10/613* (2014.01)
(Continued)

(52) U.S. Cl.
CPC ....... *H01M 50/271* (2021.01); *H01M 10/613* (2015.04); *H01M 10/653* (2015.04); *H01M 10/6551* (2015.04); *H01M 10/6556* (2015.04); *H01M 10/6557* (2015.04); *H01M 50/213* (2021.01); *H01M 50/262* (2021.01); *H01M 50/296* (2021.01); *H01M 50/394* (2021.01);
(Continued)

(58) Field of Classification Search
CPC ............. H01M 10/653; H01M 50/213; H01M 50/262; H01M 50/394; H01M 50/584; H01M 50/284; H01M 50/296; H01M 50/509; H01M 50/559; H01M 10/613; H01M 10/6551; H01M 10/6556; H01M 10/6557; H01M 10/6563; H01M 10/6567; H01M 2220/20
See application file for complete search history.

(56) References Cited

U.S. PATENT DOCUMENTS 5,080,983 A * 1/1992 Alexon ............... H01M 50/247
429/57
9,843,027 B1 * 12/2017 Spotnitz .............. H01M 50/224
(Continued)

FOREIGN PATENT DOCUMENTS

JP 2020-013750 1/2020
KR 10-2191300 12/2020
(Continued)

OTHER PUBLICATIONS

International Search Report and Written Opinion for International Application No. PCT/US2022/020644 mailed Aug. 8, 2022, 14 pages.
(Continued)

*Primary Examiner* — Eugenia Wang
(74) *Attorney, Agent, or Firm* — Womble Bond Dickinson (US) LLP

(57) ABSTRACT

A battery holder may include a negative electric terminal that includes a first coiled spring, a positive electric terminal that includes second coiled spring, and a pin that aligns mating of the negative connector and the positive connector. Other aspects are described and claimed.

18 Claims, 16 Drawing Sheets

(51) Int. Cl.
  *H01M 10/653*  (2014.01)
  *H01M 10/6551* (2014.01)
  *H01M 10/6556* (2014.01)
  *H01M 10/6557* (2014.01)
  *H01M 50/213*  (2021.01)
  *H01M 50/262*  (2021.01)
  *H01M 50/271*  (2021.01)
  *H01M 50/284*  (2021.01)
  *H01M 50/296*  (2021.01)
  *H01M 50/509*  (2021.01)
  *H01M 50/559*  (2021.01)
  *H01M 50/584*  (2021.01)
  *H01M 10/6563* (2014.01)

(52) U.S. Cl.
  CPC ....... *H01M 50/509* (2021.01); *H01M 50/559* (2021.01); *H01M 50/584* (2021.01); *H01M 10/6563* (2015.04); *H01M 50/284* (2021.01); *H01M 2220/20* (2013.01)

(56) References Cited

U.S. PATENT DOCUMENTS

| 2008/0050645 | A1 | 2/2008 | Kai |
| 2012/0040221 | A1 | 2/2012 | Stoughton |
| 2012/0139491 | A1 | 6/2012 | Eberhard et al. |
| 2013/0040177 | A1* | 2/2013 | Hashio ................ H01R 11/287 429/93 |
| 2013/0071700 | A1 | 3/2013 | Hsu |
| 2015/0298573 | A1* | 10/2015 | Froelich .................... B60L 1/08 701/22 |
| 2016/0118633 | A1 | 4/2016 | Hongo et al. |
| 2017/0033332 | A1* | 2/2017 | Sakai ................. H01M 50/289 |
| 2017/0346050 | A1 | 11/2017 | Morioka |
| 2017/0365897 | A1 | 12/2017 | Okada |
| 2020/0052263 | A1 | 2/2020 | Hostler et al. |
| 2020/0091548 | A1 | 3/2020 | Zhang |
| 2020/0194853 | A1 | 6/2020 | Yoo |
| 2021/0020884 | A1 | 1/2021 | Nakano |

FOREIGN PATENT DOCUMENTS

| WO | WO-9940636 A1 * | 8/1999 | ............... B60K 1/04 |
| WO | 2019083177 A1 | 5/2019 | |
| WO | 2019163550 A1 | 8/2019 | |

OTHER PUBLICATIONS

PCT International Preliminary Report on Patentability for PCT/US2022/020644, mailed Sep. 28, 2023, 9 pages.

Non-Final Office Action for U.S. Appl. No. 17/696,589 mailed Dec. 1, 2023, 69 pages.

* cited by examiner (BACK PERSPECTIVE VIEW)

(FRONT PERSPECTIVE VIEW)

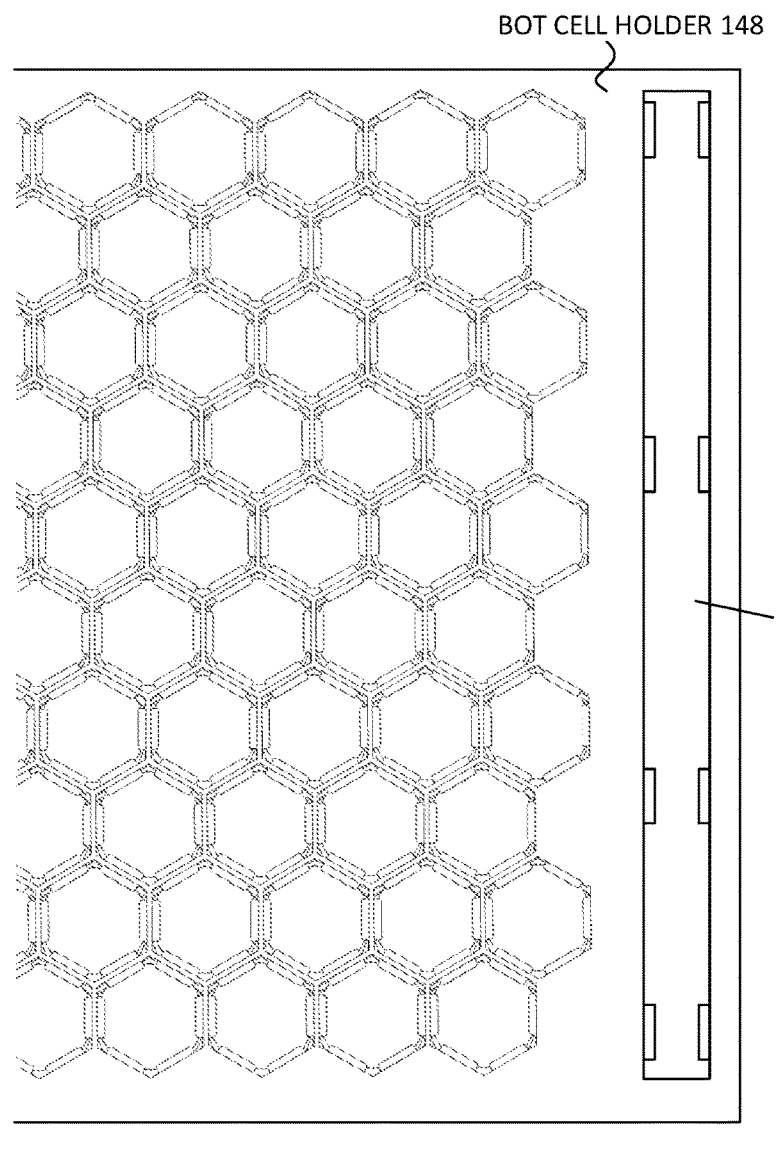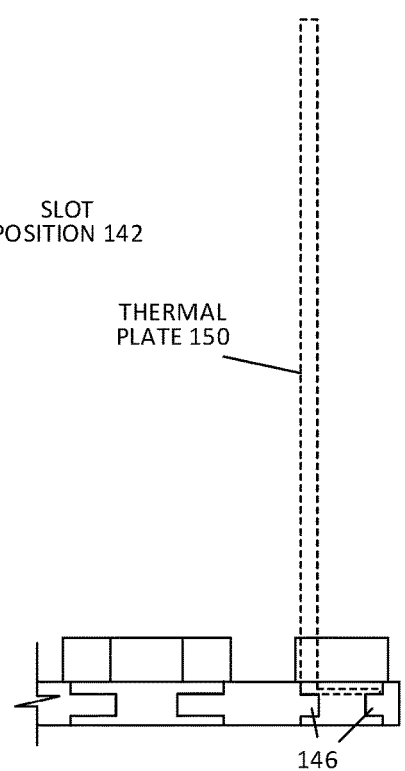
(TOP VIEW)
FIG 5A
(SIDE VIEW)
FIG 5B (PERSPECTIVE VIEW)

(FRONT VIEW)

(EXPLODED VIEW)

(TOP VIEW)

(SIDE VIEW)

ELECTRIC TERMINALS WITH CONCENTRIC SPRINGS

CROSS REFERENCE TO RELATED APPLICATIONS

This application claims the benefit of U.S. Provisional Patent Application No. 63/162,414 filed Mar. 17, 2021, which is incorporated by reference herein in its entirety.

TECHNICAL FIELD

Aspects of the disclosure relates to energy storage. In particular, aspects relate to battery module that can be housed in and removed from a battery enclosure of a vehicle or kiosk.

BACKGROUND

Lithium-ion based battery cells have a high energy density and are rechargeable. They are popular for a variety of energy storage applications such as cell phones, laptops, and electric vehicles.

Rickshaws or similar lightweight vehicles are commonly employed in many countries to transport both passengers and cargo. Traditionally, rickshaws are two or three wheeled vehicles where a human pulls the vehicle from the front and a passenger sits in the back. Rickshaws can also be machine-powered. For example, some rickshaws can have an internal combustion engine or an electric motor. A powered rickshaw that is powered by electricity may be referred to as an electric rickshaw (or e-rickshaw.) E-rickshaws have increased in popularity in some places as an alternative to gasoline powered rickshaws and pulled rickshaws because of the e-rickshaws low fuel cost and because they require less human effort compared to pulled rickshaws. However, there are economic and practical limitations that have prevented wide scale adoption of e-rickshaws.

Lithium ion battery cells have relatively high energy density compared to other battery chemistries. Thermal management and packing of battery cells can be a challenge.

SUMMARY

In some embodiments, a battery module includes a thermal conductive housing; a plurality of cells arranged within the housing; and a non-conductive (electrically insulated) bottom cell holder, arranged between the plurality of cells and the housing. The bottom cell holder can have a network of positions in which each of the plurality of cells are inserted and held, wherein each of the positions has an offsetting member that creates a space between the plurality of cells and a first side of the housing. A thermal adhesive occupies the space, thereby fixing each of the plurality of cells to the housing. As such, thermal energy can be transferred directly between the cells and the housing of the battery module, while components of the battery module are arranged in a space-efficient manner.

In some embodiments, a battery enclosure acts as a receptacle into which a battery module can be connected and removed. The battery enclosure can include a plurality of walls that form a first battery receptacle with a first opening, one of the walls being coupled to or forming a thermal plate. A pressing member can be arranged on one of the walls opposite of the thermal plate, to press the battery module against the thermal plate (or the wall that is coupled to the thermal plate), the re by thermally connecting the battery module to the thermal plate for thermal transfer.

The above summary does not include an exhaustive list of all embodiments of the present disclosure. It is contemplated that the disclosure includes all systems and methods that can be practiced from all suitable combinations of the various embodiments summarized above, as well as those disclosed in the Detailed Description below and particularly pointed out in the Claims section. Such combinations may have particular advantages not specifically recited in the above summary.

BRIEF DESCRIPTION OF THE DRAWINGS

Several embodiments of the disclosure here are illustrated byway of example and not by way of limitation in the figures of the accompanying drawings in which like references indicate similar elements. It should be noted that references to "an" or "one" embodiment in this disclosure are not necessarily to the same embodiment, and they mean at least one. Also, in the interest of conciseness and reducing the total number of figures, a given figure may used to illustrate the features of more than one embodiment of the disclosure, and not all elements in the figure may be required for a given embodiment.

FIG. 5A and FIG. 5B show a slotted bottom cell holder and thermal plate, according to some embodiments.

DETAILED DESCRIPTION

The following description is of various exemplary embodiments only, and is not intended to limit the scope, applicability or configuration of the present disclosure in anyway. Rather, the following description is intended to provide a convenient illustration for implementing various embodiments including the best mode. As will become apparent, various changes may be made in the function and arrangement of the elements described in these embodiments without departing from the scope of the appended statements.

For the sake of brevity, conventional techniques for battery pack construction, configuration, and use, as well as conventional techniques for thermal management, operation, measurement, optimization, and/or control, may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical system or related methods of use, for example various battery modules may be interconnected to various electrically powered rickshaws or other lightweight transportation devices.

Figure 1A:
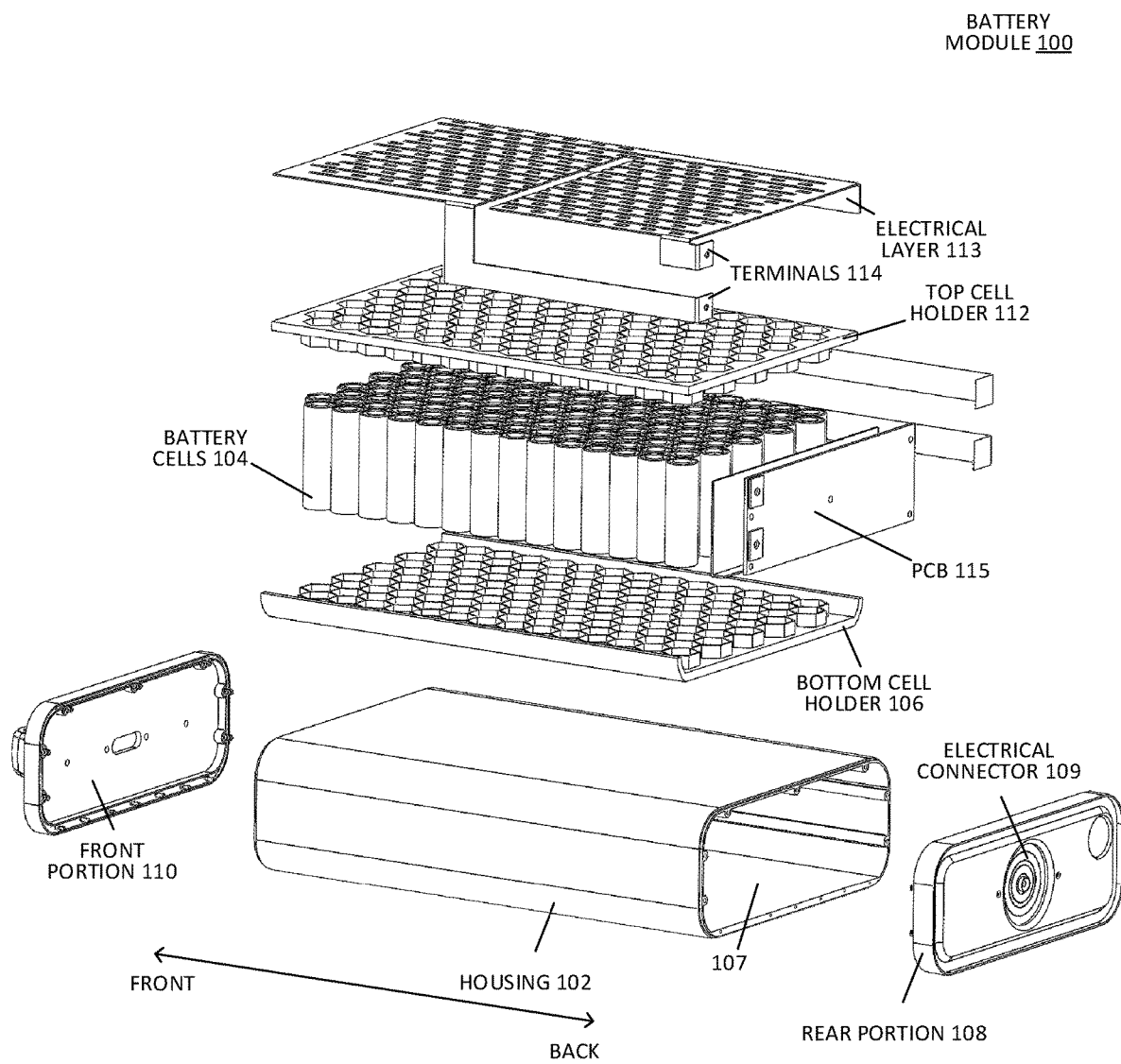
FIG. 1A and FIG. 1B show a battery module, according to some embodiments.
Figure 1B:
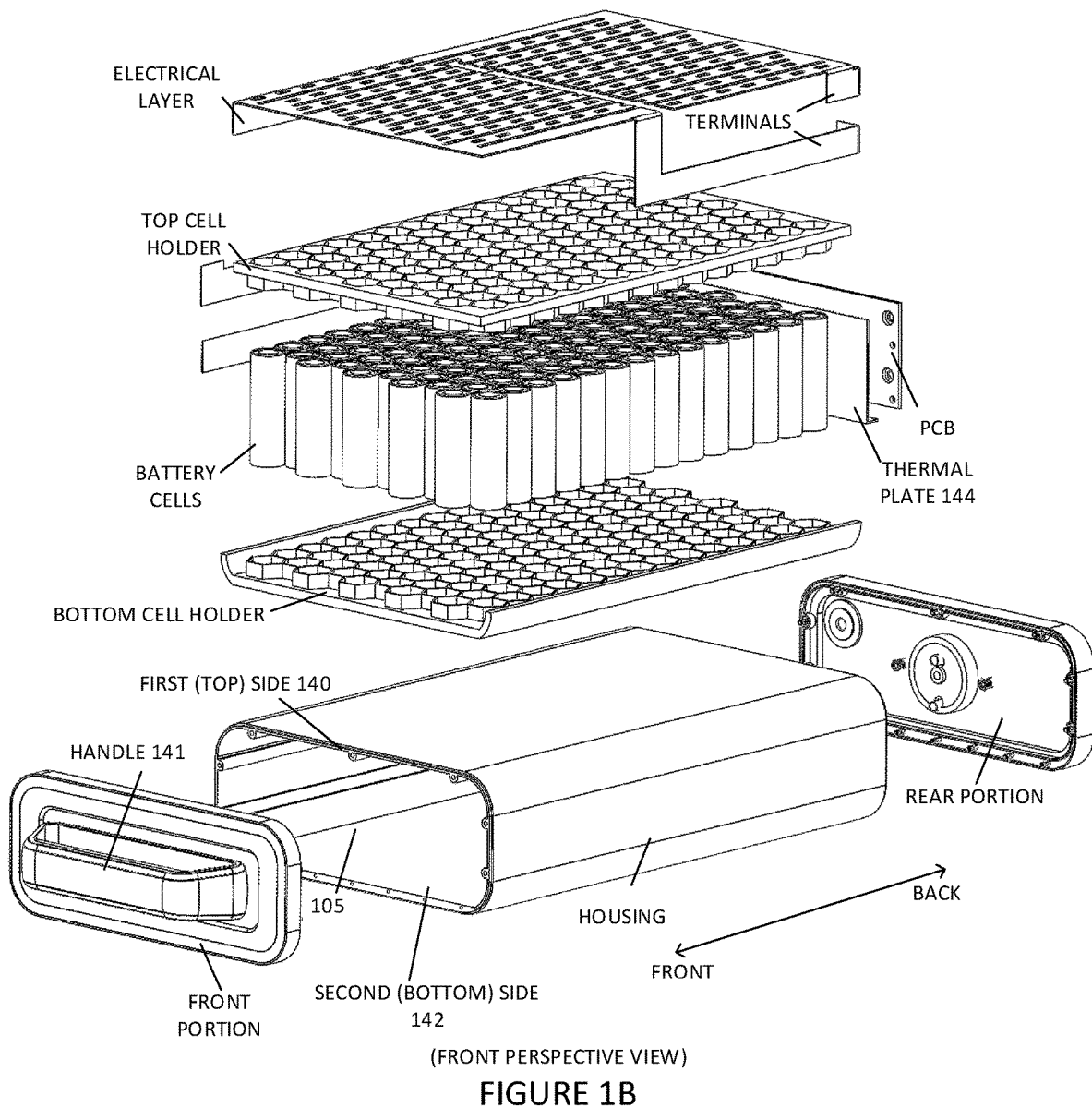

A battery module 100 is shown in FIG. 1A and FIG. 1B, according to some embodiments. The battery module includes a thermal conductive housing 102, a plurality of cells 104 arranged within the housing, and a bottom cell holder 106.

A rear portion 108 can include an electrical connector 109 that interfaces with an external receptacle. Further, a front portion 110 can include a handle. The housing can have one or more flat, smooth surfaces, so that the battery module can be slid into position within the external receptacle, such that the rear portion mates to an electrical connector of the external receptacle. This is discussed in other sections. The housing can include a suitably thermally conductive material such as aluminum or other metal or metal alloy.

Figure 2A:
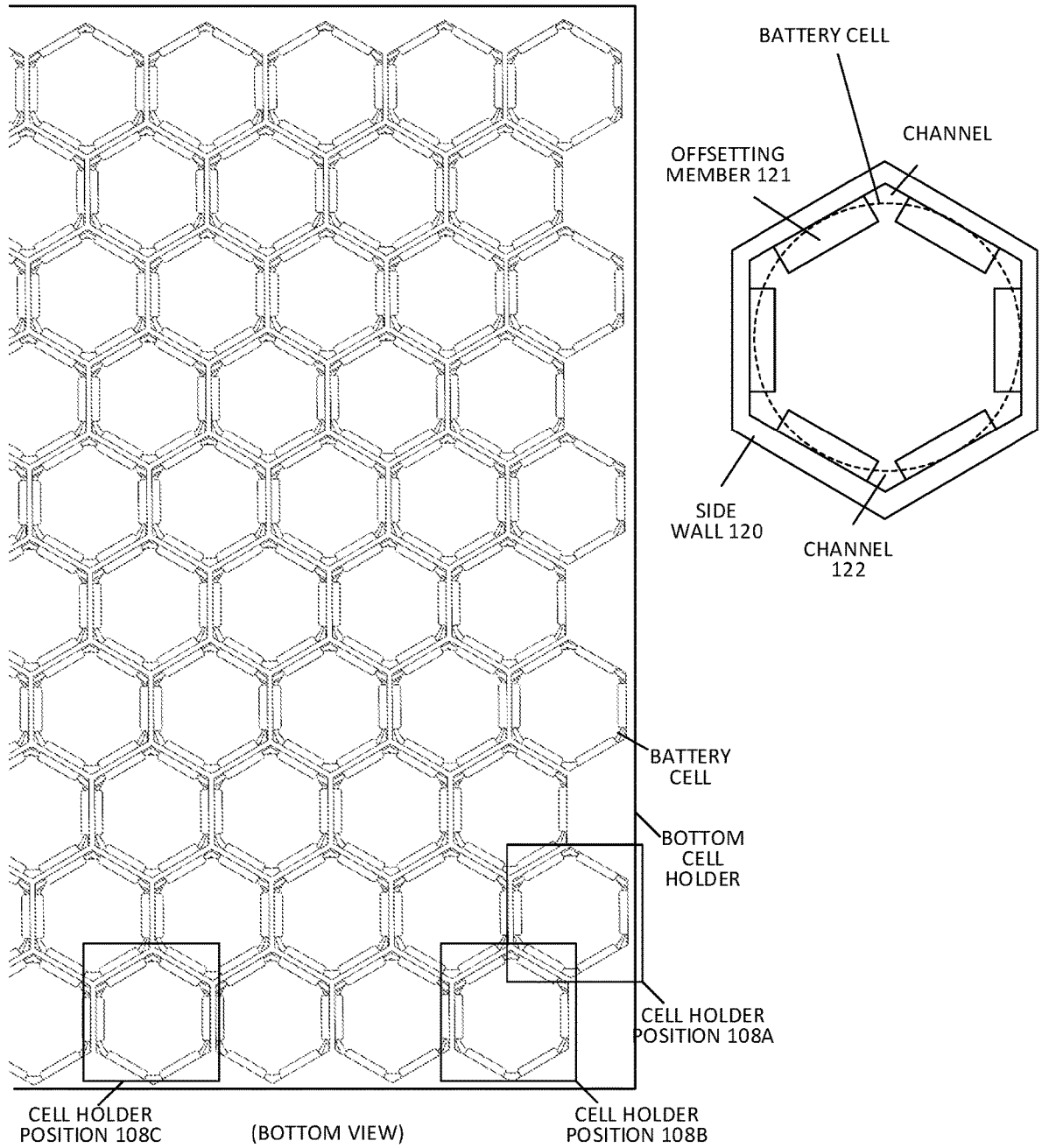
FIG. 2A, FIG. 2B, and FIG. 2C show views of a cell holding layer, according to some embodiments.

The bottom cell holder 106 is arranged between the plurality of cells and the housing. The bottom cell holder can be a single continuous structure (e.g., a monolithic structure) that has a network of positions (e.g., 108a, 108b, 108c, etc. as shown in FIG. 2A) in which each of the plurality of cells 104 are inserted and held in place. Further, each of the positions has an offsetting member 109 that creates a space between the plurality of cells and a first side 110 of the housing. The bottom cell holder can be a non-conductive structure (electrically insulated), for example, composed of a polymer material (e.g., a plastic).

A top cell holder 112 can be arranged between the plurality of cells and the housing, holding each cell on a side opposite of the bottom cell holder. The top cell holder can similarly have a network of positions in which each of the plurality of cells are inserted and held in place. The top cell holder can be formed from an insulating material, such as a polymer composition (e.g., a plastic).

An electrical layer 113 can be arranged on top of the top cell holder. Each position of the top cell holder can have an opening where an electrical connection is made between the battery cell and the electrical layer. The electrical layer can be configured by scoring and/or cutting to interconnect the cells in a desired circuit (e.g., in series and/or parallel). Terminals 114 can provide a battery positive and battery negative. These terminals can connect to one or more PCBs 115, which can, in turn, connect the terminals externally through the electrical connector 109. The electrical layer can have an insulated top surface, so that contact with the housing will not short the battery. The insulated top surface can be an insulation coating or layer, such as a polymer composition or other equivalent insulating material.

The electrical layer and the top cell holder can be formed separately and then integrated together as a single layer. The battery cells can be connected to the electrical layer through wire bonding or other equivalent technique. The electrical layer can be substantially planar, occupying a single plane. Such an arrangement reduces the presence of wire harnesses internal of the battery module, thereby reducing the footprint and production effort. The electrical layer can be formed from a conductive material such as a metal (e.g., aluminum, copper, etc.). In some embodiments, the electrical layer is an aluminum layer, thereby providing structural integrity and weight savings to the battery module.

FIG. 2A shows a bottom cell holder, from the bottom view, according to some embodiments. The bottom cell holder has a plurality of positions 108A, 108B, 108C, etc., that form a network of positions in which battery cells can be inserted.

Figure 2B:
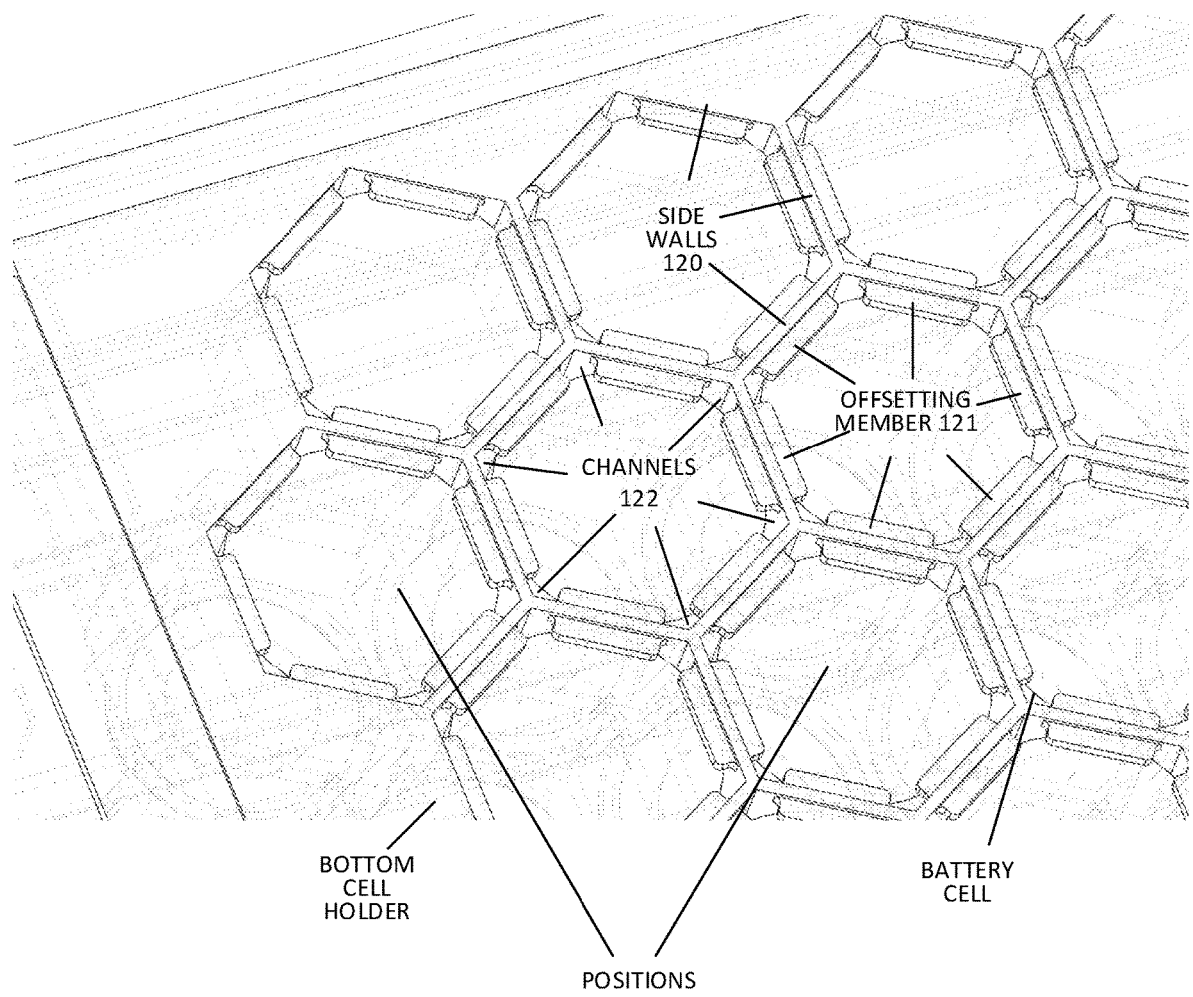

FIG. 2B shows a perspective view of the bottom holder from the bottom. It can be seen in FIGS. 2A and 2B that each position can have sidewalls 120. The sidewalls can form a polygon shape into which each cell can be inserted. In some embodiments, the sidewalls form a hexagon shape. Such shape allows the positions to nestle together in an interlocking manner. In other embodiments, the sidewalls can form a triangle, square, or other polygon shape. The sidewalls can each be substantially straight.

In some embodiments, each position includes one or more offsetting members 121, that can protrude from one or more of the sidewalls. The offsetting member creates a space or gap between the battery cell and the battery housing, so that the battery cell does not electrically conduct to the housing, which can short the cells. The offsetting members can be tabs or ledges that protrude from the sidewalls.

In some embodiments, each of the positions can have one or more channels 122. The channels allow adhesive to flow up from between the space under the battery cell (between the battery cell and the battery housing) to a space along a length of the battery cell. In other words, the channels fluidly connect the space under the battery cell to negative space between the battery cell and the sidewalls of the bottom cell holder. The channels can be formed by negative space (gaps) between the offsetting members. The channels can be located at the intersections of the polygon formed by the sidewalls of the bottom cell holder. The intersections of the polygon fit a cylindrical battery cell such that negative space (see negative space in FIG. 3) is created between the cell and the cell holder at the intersections. As such, adhesive can flow into and occupy the negative space.

Figure 2C:
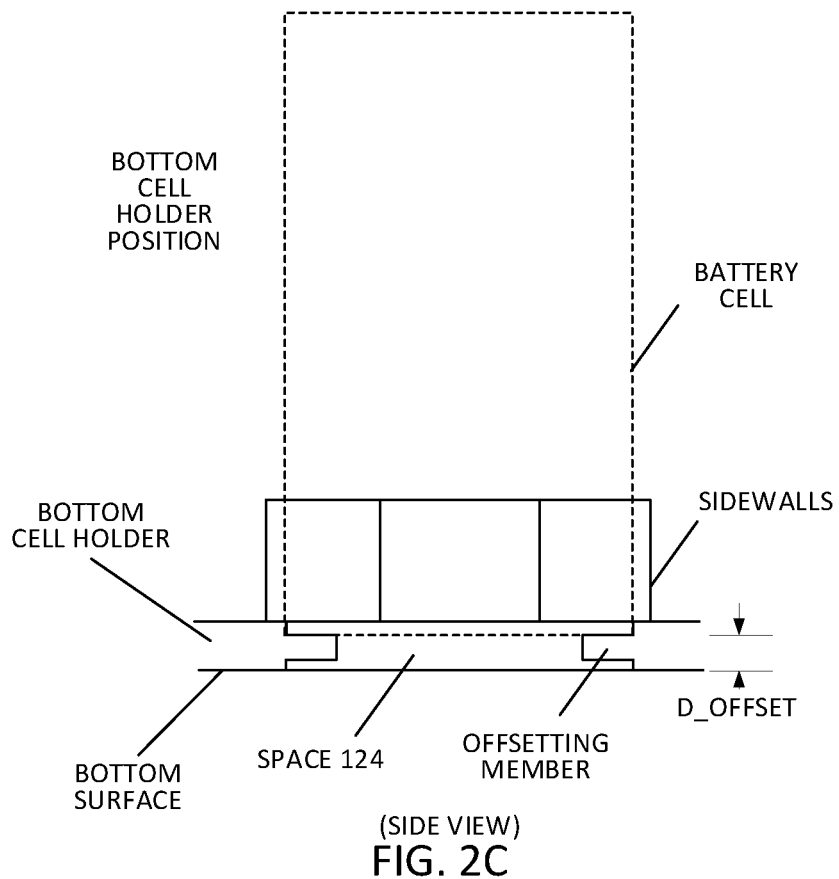

FIG. 2C shows a battery cell and bottom cell holder from a side view, according to some embodiments. This further illustrates the interface between the battery cell, the bottom cell holder, and adhesive. The battery cell fits into position of the cell holder. The cell holder's sidewalls 112 can extend vertically along a length of the battery cell, as shown, to provide guidance for the battery cell, structural support, and a cup for adhesive to flow into and occupy. The one or more offsetting members create an offset (D_OFFSET) between the battery cell and a bottom surface of the cell holder. This bottom surface of the cell holder is then pressed flush against the housing of the battery module, which provides a compact and thermally conductive arrangement for the battery cells.

Figure 3:
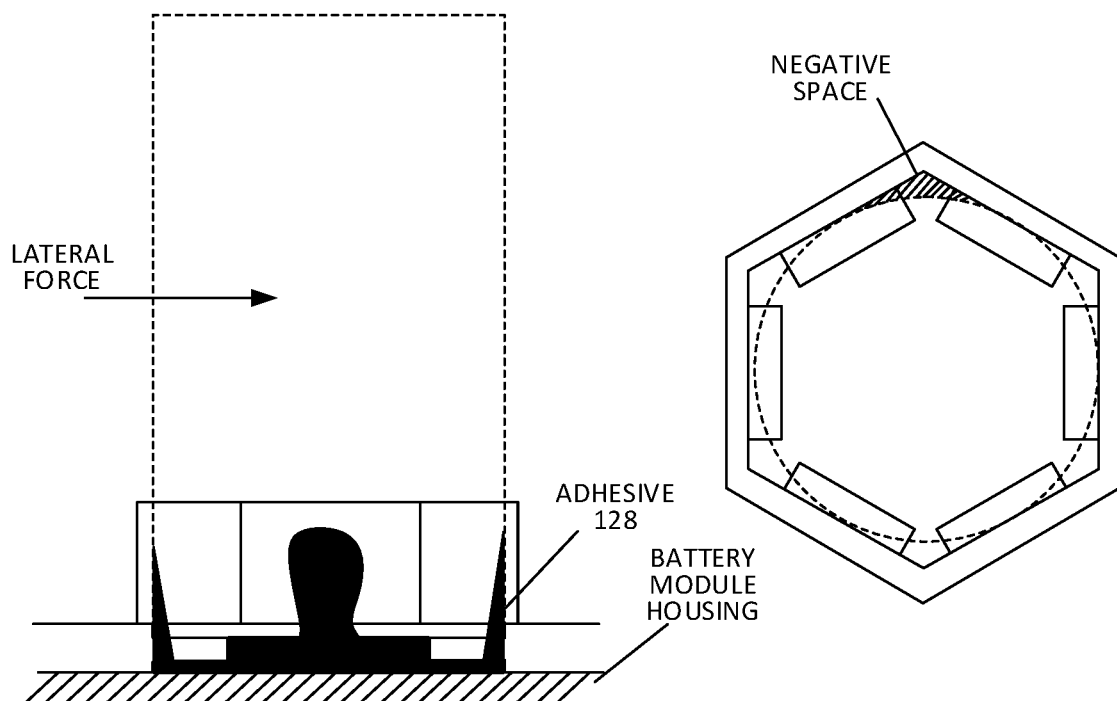
FIG. 3 shows a cell holding layer and adhesive, according to some embodiments.

FIG. 3 shows the battery cell and bottom cell holder with adhesive, according to some embodiments. An adhesive 128 is deposited into and occupies the space between the battery cell and the cell housing, to fix each battery cell to the housing. Additionally, the adhesive is a thermally conductive adhesive, that transfers thermal energy between the battery cell and the battery housing. As such, thermal energy can be transferred directly from each battery cell to the battery housing with minimal intermediate structures, and in an electrically isolated manner. The adhesive can have a thermal conductivity (e.g., ASTM D5470, W/(m-k)) of 1.5, 1.0 or better. The thermal adhesive can be electrically insulating (e.g., greater than 1 Mohms resistance) so that the cells do not short through the battery housing. In some embodiments, the adhesive is an epoxy.

As discussed, the adhesive can occupy the space between the battery cell and the cell housing, as well as through the negative space between the battery cell and the side walls, located along at least a portion of a length of each of the plurality of cells. The adhesive flows through the channels and up along the sides of the battery cells, and the thermal adhesive is also located in the one or more grooves. With this arrangement, the adhesive holds bottom of each cell to the housing, as well as a surface of the cell along a length of the cell, thereby providing additional holding strength of the plurality of cells to the housing, against lateral forces.

It should be understood that a thermally conductive housing, adhesive, or other thermally conductive material can include a material formed from metal, and/or having thermal conductivity (W/(m-k)) of 1.5, 1.0 or better.

In some embodiments, a method of manufacturing the battery module includes depositing the adhesive in the space between each cell and the battery module housing (e.g., a first side). The thermal adhesive fixes each of the plurality of cells to the battery module housing, thereby creating a thermal path from the cell to the housing to transfer thermal energy. If such a bond is compromised, then the cell may lose thermal conductivity to the cell housing, which can lead to failure. After being deposited in the space, the adhesive then travels up along the length of the battery through the channels, as described.

As shown in FIG. 1, in some embodiments, the battery module includes a non-conductive electrically insulated top cell holder 120 that is arranged between the plurality of cells and a second side 142 of the housing that is opposite of a first side 140 of the housing. As discussed, the top cell holder has a second network of positions in which each of the plurality of cells are inserted. As such, the cells are held at a top portion of the cell and a bottom portion of the cell, to provide a firm and balanced hold. Similar to the bottom cell, the top cell can include sidewalls that form a polygon (e.g., a hexagon or other shape). The sidewalls can protrude a height along the battery cell. In some embodiments, the sidewalls of each of the top or bottom cell holders can have a height of 1-20 millimeters. In some embodiments, the sidewalls extend 1-10 millimeters. The height of the sidewalls can vary without departing from the scope of the disclosure.

Figure 4:
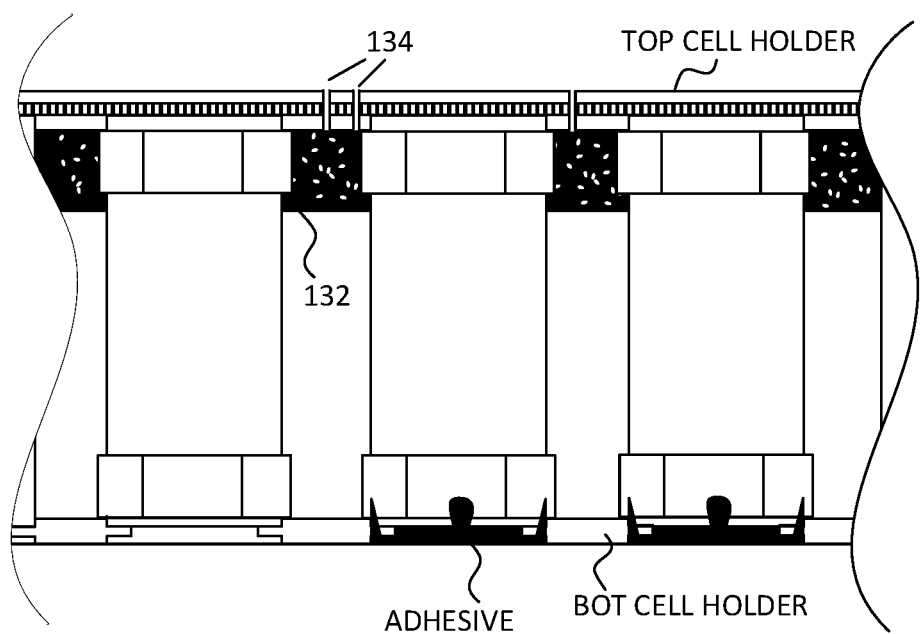
FIG. 4 shows a bottom cell holder and top cell holder arranged with battery cells, according to some embodiments.

In some embodiments, as shown in FIG. 4, a potting material 132 (e.g., an epoxy resin or other equivalent technology) occupies space between the cells. The potting material can occupy space around at least a top portion of each of the plurality of cells, providing additional holding of the cells, which is critical to maintaining thermal transfer to and from the cells.

In some embodiments, the potting material includes a filler material such as, for example, glass beads or vacuum filled glass beads, thereby reducing weight of the battery and cost of the potting. In some embodiments, the top cell holder can include one or more openings 134 that help the potting material set into position during manufacturing. Additionally, or alternatively, the potting material can flow into position by submersing the top portion of the battery cell and top cell holder into a bath of the potting material (e.g., with a potting tray). Other techniques can be used for potting. Thus, in some embodiments, the openings are not present.

Referring to FIG. 1A, in some embodiments, the housing 102 is a monolithic structure (e.g., formed through extrusion or other equivalent technique). In other words, the housing does not have any divisions or seams between its sides, nor have the sides been welded together. As such, the housing can provide a thermally conductive solution that is uniform from one point of the housing to another. Such a feature provides coverage in case the battery module is accidentally installed with the hot side (e.g., the bottom side) of the battery module faced away from a thermal plate of the battery receptacle.

Referring to FIGS. 5A and 5B, in some embodiments, the bottom cell holder 148 includes a slotted position 142 arranged substantially along a side 'S' of the bottom cell holder into which a thermal plate 150 (which can be seen as thermal plate 144 in FIG. 1B) can be inserted and held in place. The thermal plate can mechanically and thermally couple to one or more PCB, to transfer thermal energy between the one or more PCBs and the battery module housing. The PCB can house electronics related to performing battery management (e.g., a 'BMS' or battery management system). The BMS can include semiconductor devices used for cell balancing and isolation, one or more processors, measurement circuits, sensors, transceivers, and/or other passive or active electronic components or SOICs common to a BMS.

Similar to the positions that hold the battery cells, the slotted position can a thermal plate offsetting members 146 that creates a second space between the thermal plate and the housing in which the thermal adhesive is deposited. This mechanically fixes the thermal plate to the housing and thermally couples the two together as well. As such, electronic components (e.g., processors, semiconductors, transceivers, etc.) can utilize a common thermal transfer infrastructure (the housing, thermal adhesive, and bottom cell holder) to reduce complexity and assembly effort.

Figure 6:
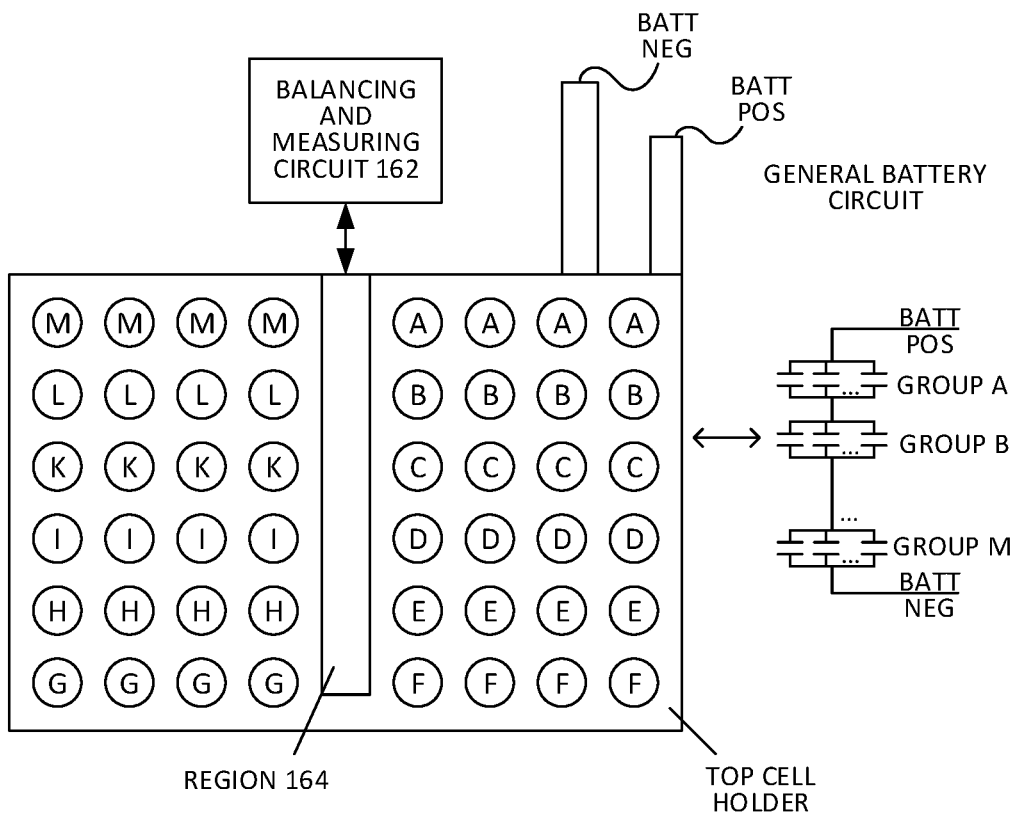
FIG. 6 shows an electric circuit of battery cells, according to some embodiments.

FIG. 6 illustrates connection of the plurality of battery cells, in some embodiments. The plurality of cells can be electrically connected in a plurality of parallel groups (e.g., A, B, C, etc.) that are wired in series (A to B to C, etc.). An electric circuit (e.g., a flexible printed circuit board) is disposed within a region 164 of the top cell holder. The circuit can be integral to the top cell holder, or occupy a cut out portion of the top cell holder. The electric circuit can include conductive paths (e.g., wires, traces, etc.) that connect the cells to balancing and measurement circuit 162, which can include an arrangement of voltage sensors, semiconductors, switching devices, processors, and/or other passive or active components. The balancing and measurement circuit can be integral to the BMS. Cell voltage sensing and cell balancing of each of the plurality of parallel groups can be performed through the electric circuit, thus further reducing the presence of wire harnesses.

In some embodiments, as shown in FIGS. 1A and 1B, the housing has a first opening 108 at a rear portion of the battery module and a second opening 105 at a front portion of the battery module. In some embodiments, the battery module has a rectangular cuboid form. The first side 140 and a second side 142 that is opposite of the first side can have substantially more surface area (e.g., four times more area, or greater) than other sides of the battery module. In other words, the battery module is substantially flat. In such a manner, a large surface area (e.g., a flat side) can transfer thermal energy effectively, such as through the second (bottom) side of the housing.

In some embodiments, a front portion of the battery module includes a handle 141 as shown in FIG. 1B. As such, a user can grip the handle to slide the battery module into and/or out of a battery enclosure (as described in other sections). A battery enclosure may also be referred to as a battery holder or battery receptacle. A user may slide the battery module into the battery holder and electrically mate the battery module with the battery holder through a blind-mate connection.

Figure 7A:
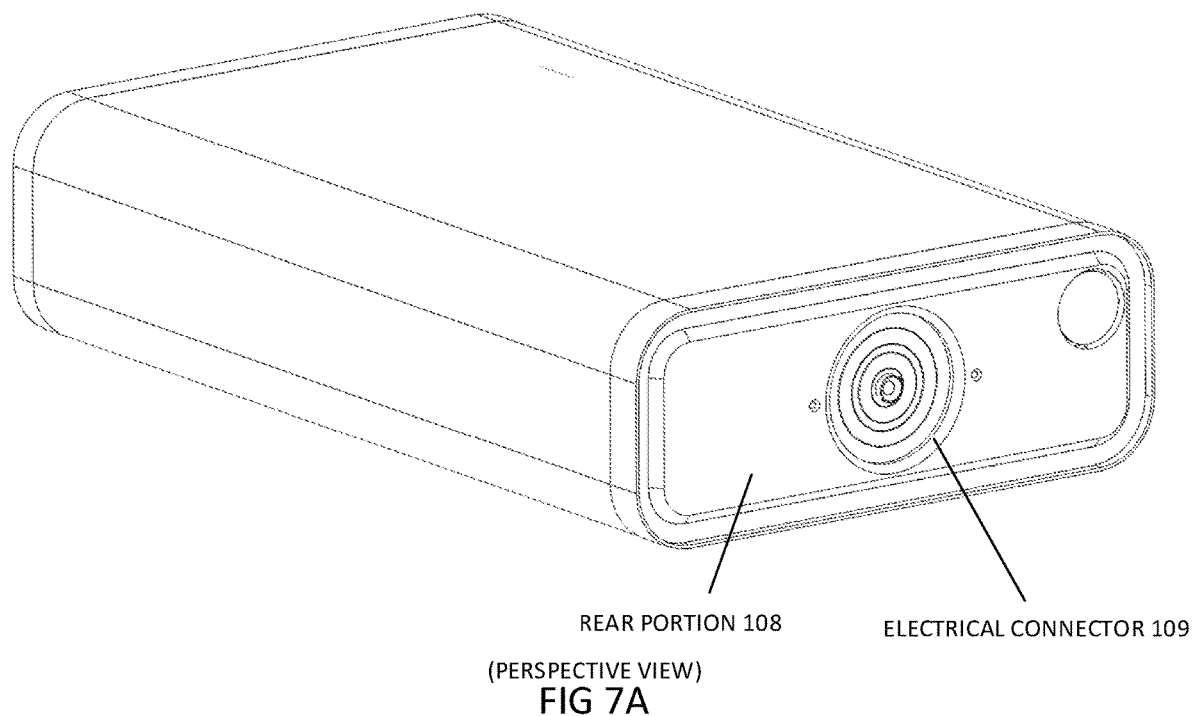
FIG. 7A, FIG. 7B, and FIG. 7C show a rear portion of a battery module, according to some embodiments.
Figure 7B:
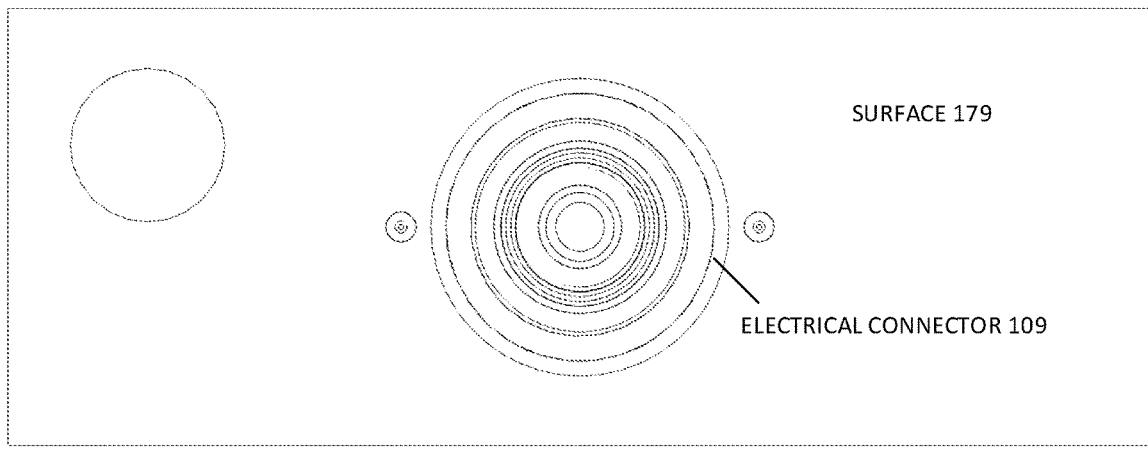

FIG. 7A and FIG. 7B show a rear portion 108 of the battery module, according to some embodiments. The rear portion of the battery module refers to the portion of the battery module that faces the opening of a battery enclosure when the battery module is slid into the battery enclosure.

The rear portion of the battery module can include an electrical connector 109. The electrical connector can be recessed from the surface 179 of the rear portion. As such, if the battery module is laid down on the rear portion, the electrical connector can be free from contact with the ground, thereby reducing the risk of a short circuit.

Figure 7C:
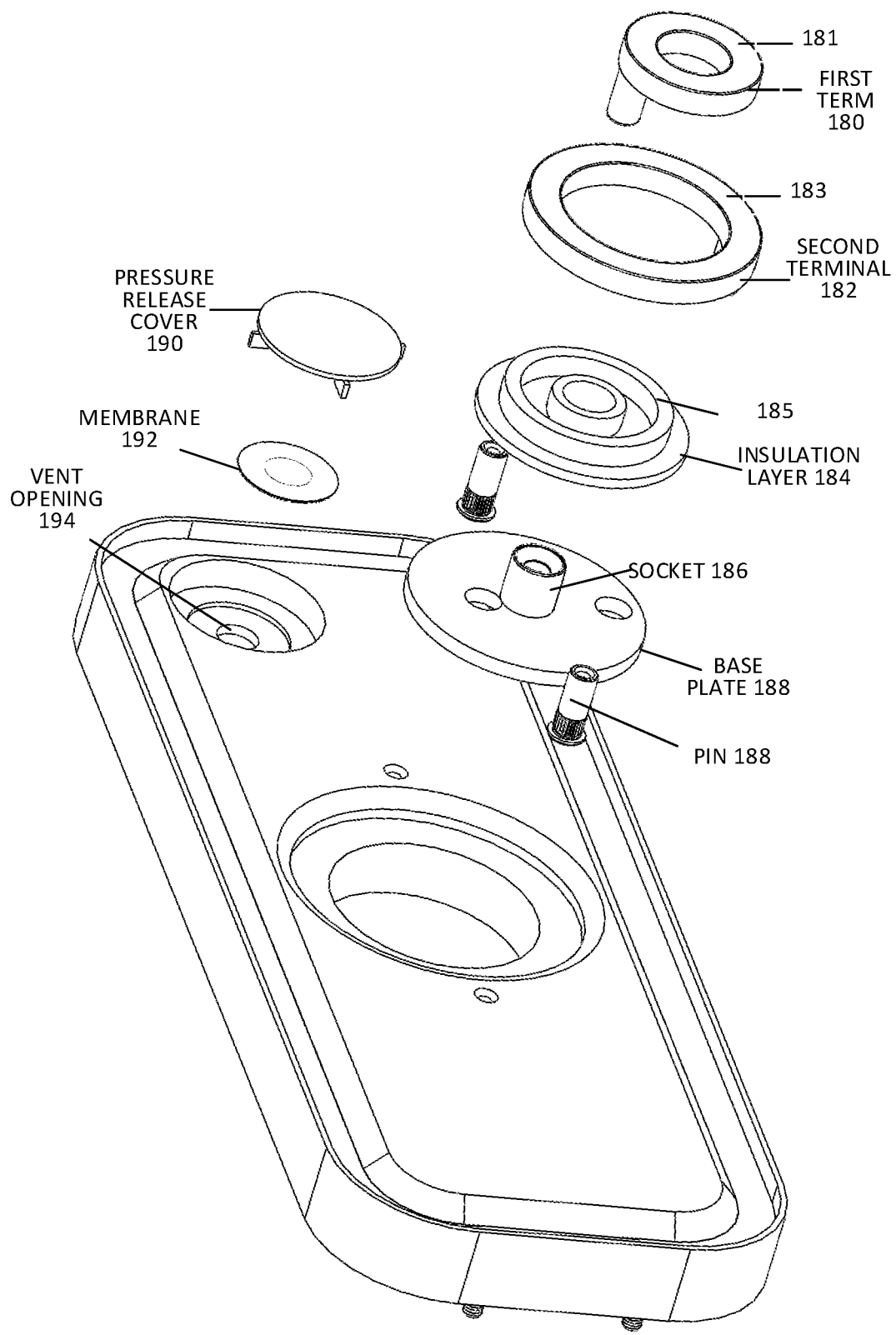

In FIG. 7C, the electrical connector can include a first terminal 180 that has a mating surface 181 in the shape of a ring and a second terminal 182 that also has a mating surface 183 in the shape of a ring. The mating surfaces of the first terminal and second terminal can be aligned in substantially the same plane. The mating surface can also be flat. In some embodiments, the first terminal (the inner ring) has the battery positive electric potential, and the second terminal (the outer ring) has the battery negative electric potential. In other embodiments, the order is reversed. As such, the electrical connector does not have or require pins (it is a pin-less connector), that can be wiped and maintained with ease and is resistant to damage. The mating surfaces can be substantially flat.

An insulation layer 184 includes a wall 185 (which can be a compressible material to act as a gasket) that separates the first terminal and the second terminal. The insulation layer wall can also have flat surface that is located between the first terminal and the second terminal, thus maintaining a uniform flat surface of the electrical connector in the mating region of the connector. A base plate 188 can have a mating socket 186 that mates with a pin of the battery enclosure, to pull and hold the battery and enclosure together. The socket can also guide and align the placement and connection of the battery and enclosure by mating with a pin of the battery enclosure. As such, the battery can be mated in a self-aligning manner with the battery enclosure by applying pressure, without manual twisting, and without tools. The electrical battery connector is a blind-mate connector, requiring a push of the battery module into the battery enclosure to mate the electrical connection between the two. The mating socket can be located inside the ring (e.g., at the center) of the first terminal to help align the electrical connectors of the battery.

In some embodiments, the socket can have threads (e.g., internally not shown). The pin and socket guides placement of the negative terminal and the positive terminal to mate with a corresponding negative terminal and a corresponding positive terminal of the battery enclosure.

In some embodiments, one or more insulated standoffs are located on the rear portion of the battery module, to reduce risk of contact to the positive and/or negative terminal if the battery module is laid down on its rear side.

In some embodiments, a rear portion of the battery module includes a vent opening 194 with a filtering membrane 192 that allows passing of gas but not solid material. Such a vent can prevent over-pressurization that could result from changes in atmospheric pressure (e.g., when traveling on airplanes). Further, the vent can serve as a controlled point of failure (for energy to transfer out of) in case of battery over-heating.

A pressure release cover 190 can fit over the vent opening. This pressure release cover can be held in place by fit (e.g., one or more clips or tabs that hold it in place), however, if pressure builds within the battery module, the pressure release cover pops off because it is not held in place by more stringent means (e.g., screws or fasteners). The cover protects the filtering membrane from direct exposure to elements such as dirt, liquid, etc., and allow for hosing down of the battery module. The vent opening can be in fluid connection with the plurality of battery cells, so that gas and pressure from the plurality of battery cells can flow freely to and out of the vent opening.

In some embodiments, the battery module can have a thermal cooling solution fixed directly to the housing, thereby providing an all-in-one battery solution, rather than installed in or removed from a battery enclosure. In such as a case, a thermal plate can be stamped or welded to the first side of the housing. The thermal plate can have one or more fins (for fan cooling) or one or more channels for circulating a coolant (for a fluid-based solution).

Each battery cell of the battery module can be a cylindrical lithium-ion rechargeable cell in standard battery package of AA, AAA, 18650, 20700, 21700, or other standard cell geometry. Each cell can have a nominal voltage of 3.6-3.7 volts. The battery cells can have other form factors such as rectangular flat cells. The type of cells used can also be Lithium-Ion, Lithium-polymer, Lithium-Iron, Phosphate, or equivalent cell types.

As discussed, the battery module can include sensors and electronics such programmed processors, transceivers, and/or power circuits that utilize solid state switching (e.g., transistors, FETs, other semi-conductor devices) or relays to isolate, bypass, and/or balance individual cells or groups of cells connected in parallel.

Sensors can include one or more current sensors, voltage sensors, and temperature sensors measured at the cell and/or pack level. Protection circuitry (e.g., various integrated circuits that are available off the shelf) can determine undercharge or overcharge, temperature, medium current and time, and high currents within the battery system. Similarly, the electronics can include a cell balancing circuit that can bypass currents at ⅛ the capacity of a cell.

The battery management system (BMS) can determine overall battery control, state of charge (SOC), state of health (SOH) of the battery, and state of power (SOP) of the battery through known SOC, SOH, and SOP algorithms. In some embodiments, a BMS can also perform higher level control and management, data management (e.g., data acquisition and communication of data), wireless communication, power line communications, and over the air (OTA) software updates.

Figure 8:
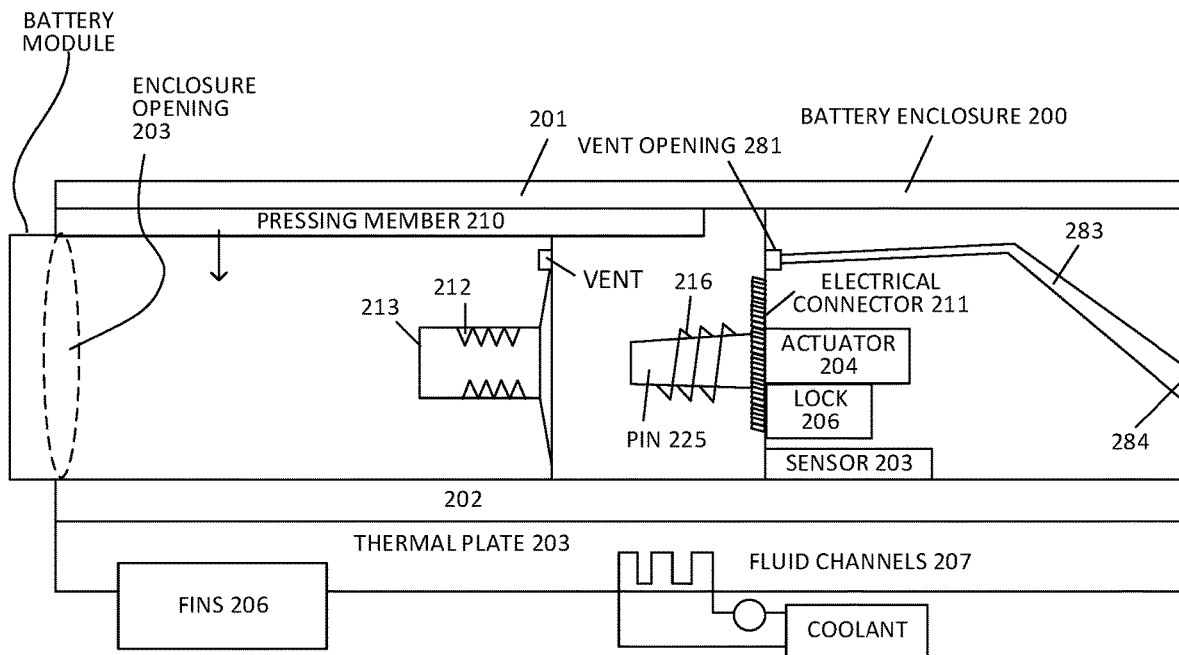
FIG. 8 shows a battery enclosure, according to some embodiments.

A battery enclosure 200 and battery module (as described in any of the sections) are shown in FIG. 8 according to some embodiments. The battery enclosure includes a plurality of walls (e.g., 201 and 202) that form a first battery receptacle with a first opening 203. At least one of the walls (e.g., 202) is coupled to a thermal plate 203. In some embodiments, the wall itself is the thermal plate.

A battery module (such as a battery module in the embodiments described in other sections) is removable and insertable from and to the first battery receptacle through the first opening. A pressing member 210 presses a side of the battery module against the thermal plate to thermally connect the battery module to the thermal plate. In some embodiments, the pressing member can include one or more rails with one or more spring-loaded members. The spring-loaded members can slant towards the interior wall of the enclosure to give clearance to the battery module so that the battery module does not get caught on the one or more members when it is inserted into the enclosure.

A pin 225 can mate to a socket 213 on the battery module to guide, pull, and hold the battery module to the battery enclosure. The electrical connector 211 can mate to the electrical connector of the battery module. The electrical connector can have a first terminal and second terminal, each of which can mate to a positive or negative terminal of the battery module. The pin enters the socket when the battery module is pressed into the battery enclosure, thereby aligning the terminals of the battery module to the electrical connector of the battery enclosure. The pin can have threads 216 that mate with threads 212 located in the socket of the battery module. Thus, when the pin is actuated, this draws the battery module into the battery enclosure.

An actuator 204 can move the pin (e.g., a rotation) to provide a pulling force. In some embodiments, a lock 206 can lock the pin in place at one or more predetermined positions, thereby securing the positioning of the battery within the enclosure. In some examples, the pin 225 includes a rotational screw shaft locking mechanism, the multi-point screw shaft is fully extended until a laser based time of flight sensor senses that the module is at a predetermined locking location relative to the battery enclosure. In response to the module being sensed at the location, the screw shaft is slowly actuated using mechanical or electro-mechanical means (an actuator or motor for instance). The screw shaft twists into the screw mate socket within the battery module, locking the screw shaft within the module and simultaneously locking together the blind mating electrical connectors of the battery module and the battery enclosure. A mechanical or electro-mechanical lock may hold the screw shaft in place so that the screw shaft does not rotate back out of the socket. This maintains a positive locking mechanism for the blind mate connector assembly until the user releases the battery module. As such, the pin and socket arrangement can align, pull, and lock the battery module and the battery enclosure together.

In some embodiments, a sensor 203 (e.g., a capacitive sensor, a proximity sensor, a light sensor, etc.) can sense when battery module is engaged and aligned with the battery enclosure. When they are engaged and aligned, the actuator can be driven to rotate the pin. A lock or latch 206 can be applied to the pin (preventing rotation of the pin) to securely hold the battery module in place.

Additionally, or alternatively, the battery enclosure can include other known latching mechanisms (e.g., a latch, a clip, etc.) to pull and hold the battery module to the battery enclosure.

Additionally, or alternatively, the battery enclosure can include a mechanical or electro-mechanical lock that includes a latch that can lock the battery in place. A mechanical key can be used to lock and unlock the latch to prevent theft. In some embodiments, an electronic keypad can be used to lock and unlock (e.g., with a proper combination) the battery. In some embodiments, the locking mechanism can be electronically controlled through wireless commands or through a passcode that is provided wirelessly to the battery enclosure.

In some embodiments, one or more fins attached to the thermal plate. A fan can direct air to the one or more fins, thereby removing thermal energy from the thermal plate. Alternatively, or additionally, one or more channels 207 can be attached to or integrated within the thermal plate. A pump can circulate coolant fluid through the one or more channels. Thus, depending on the expected battery load and/or external temperature, the battery enclosure can include one or more solutions to cool (or warm) the batteries accordingly. In some instances, the thermal plate may transfer thermal energy to the batteries (e.g., to improve charge or discharge capacity and/or reduce internal resistance of the battery cells). In some embodiments, a refrigerant and chiller can be used to cool the thermal plate.

Figure 9:
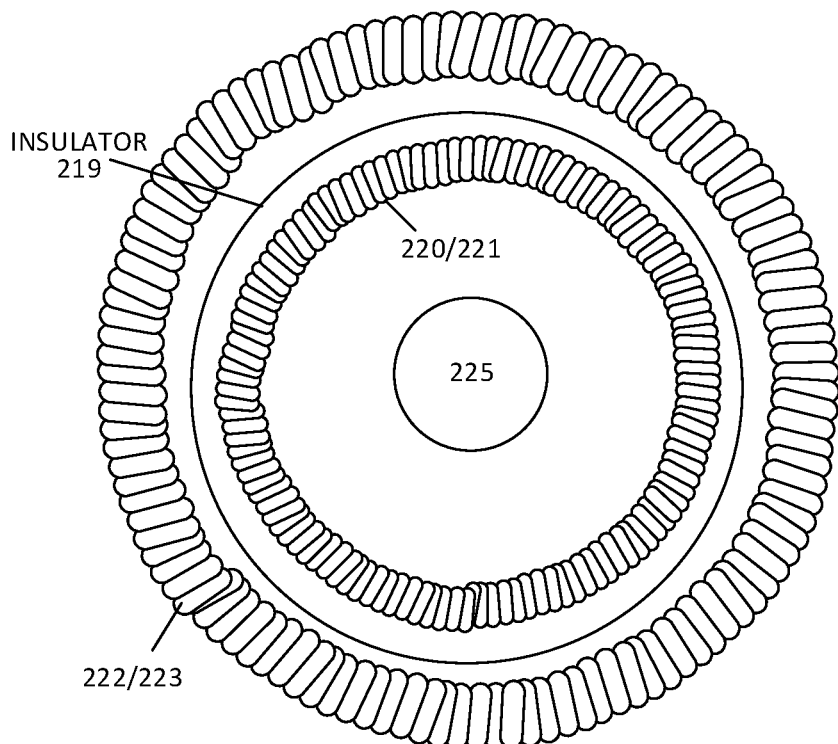
FIG. 9 shows an electrical connector of a battery enclosure, according to some embodiments.

In some embodiments, as shown in FIG. 9, the battery enclosure includes a first connector 220 that includes a first coiled spring 221, and a second connector 222 that includes second coiled spring 223. The first connector can form a ring (e.g., a circle, square, oval, or other shape). The second connector can also form a ring of similar shape around and enclosing the first connector. The first connector and the second connector may form concentric rings. The connector mates to the electrical connector of the battery module. Pin 225 can protrude from inside the ring formed by the first connector, thus helping with alignment and mating of the connectors, as described. The outer ring can be a negative terminal and the inner ring can be a positive terminal, or vice versa.

In some embodiments, an insulator 219 is arranged between the first connector and the second connector, to reduce the risk of short between the respective springs. Insulator 219 is an electrical insulator (e.g., 1M ohms or greater resistance). It can be formed of a polymer composition or other electrically insulating material. As shown, the insulator 219 can have a ring-shape wall, that occupies space between the first and second connector, there by separating and preventing contact between the two connectors. In some embodiments, the insulator 219 presses against and mates with a gasket of the battery module. For example, referring to FIG. 7C, the insulating layer 184 can include a gasket 185 which can be ring-shaped. That gasket is arranged between the first terminal 180 and second terminal 182 of the battery module. As such, the insulator and gasket reduce the risk of shorting of the battery terminals from water or other liquids.

Figure 10:
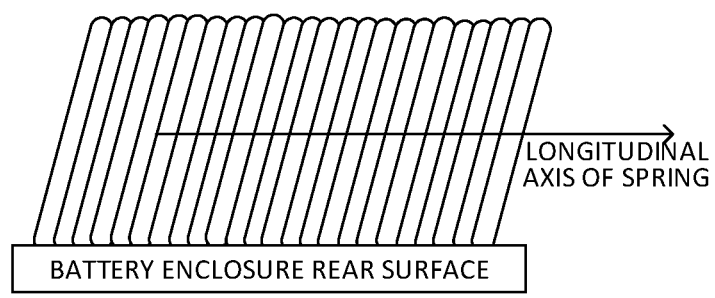
FIG. 10 shows part of an electrical connector, according to some embodiments.

FIG. 10 shows a close up side view of either the first coiled spring or the second coiled spring. The first coiled spring and the second coiled spring can be fixed longitudinally (as opposed to vertically) along a length of the spring, to a rear surface inside the first battery receptacle, similar to laying a 'Slinky' on its side. The length of the coiled spring may also be understood as the length of an axis upon which each of the coils of the spring is encircled around. Each coiled spring is further enclosed upon itself to form a ring. Thus, the positive terminal and negative terminal can resemble a spring, laid on its side, and circled upon itself, as shown in FIG. 9 and FIG. 10.

Figure 11:
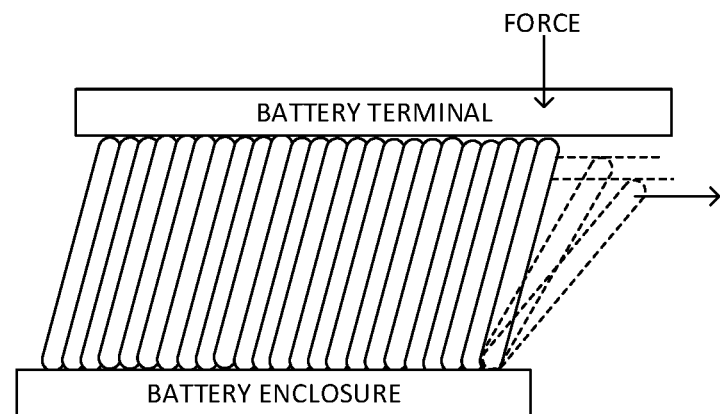
FIG. 11 shows mating of part of an electrical connector, according to some embodiments.

FIG. 11 shows compression of the springs 221 or 222 when they are mated. When the battery module is inserted in the first battery receptacle, the positive terminal and/or negative terminal of the battery module mates with the first coiled spring and the second coiled spring, causing compression of the first coiled spring and the second coiled spring. The resulting spring-loaded electrical connection provides electrical continuity through each of the turns of the coil even under vibration and shock. The compression of the springs that are laid on their side can also cause the coils of the spring to turn, thereby cleaning or a wiping the battery module's positive terminal and/or the negative terminal. As discussed, the positive and negative terminal of the battery module can have substantially flat ring-shaped surfaces to interface with the coil connectors of the battery enclosure.

Figure 12:
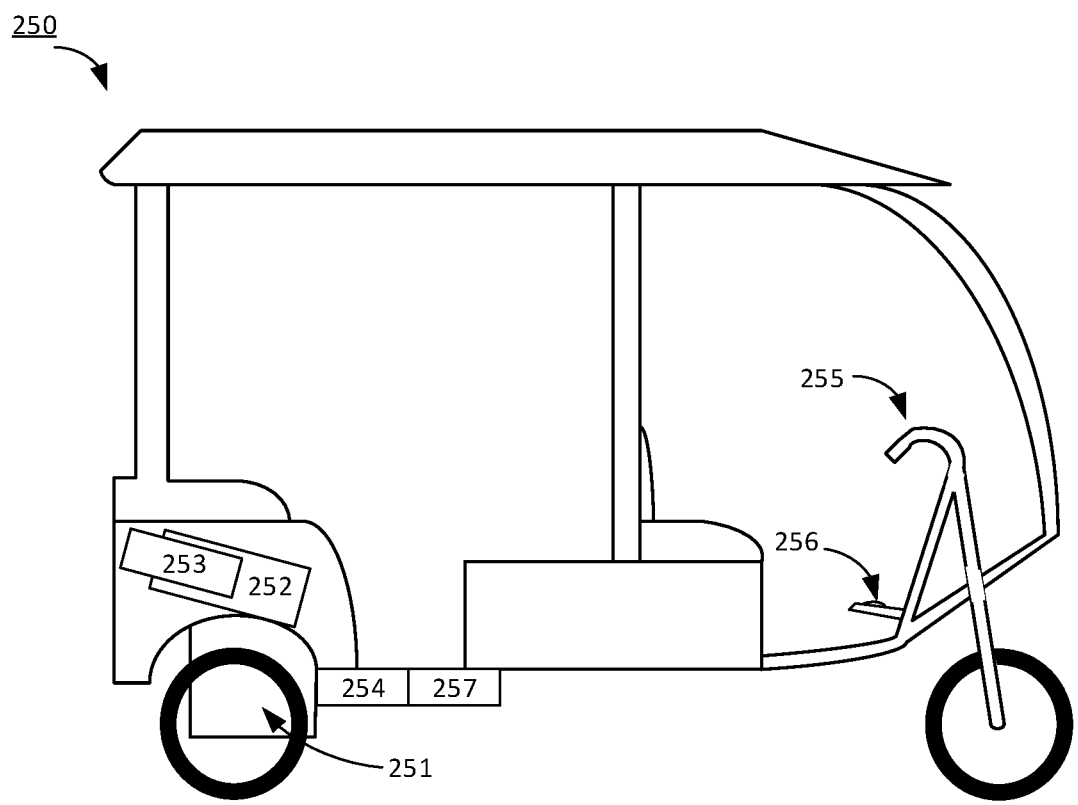
FIG. 12 shows an electric vehicle, according to some embodiments.

FIG. 12 shows a battery enclosure 252 that is part of an electric rickshaw 250, according to some embodiments. The battery enclosure 252 may be the battery enclosure described herein in any of the other sections of the disclosure (e.g., shown in FIG. 8). The e-rickshaw 250 may, in some embodiments, be a retrofit rickshaw or, in other embodiments, be a purpose-built e-rickshaw. Regardless, the e-rickshaw can have an electric motor 251 that is powered by one or more battery modules 253 and power electronics module 254. Battery modules 253 can be any of the battery modules described in the present disclosure (e.g., as shown in FIG. 1A and FIG. 1B). The power electronics module can generate AC or DC power based on the requirements of the electric motor. A steering mechanism 255 (e.g., a steering wheel and column) and throttle input 256 can be provide inputs to the controller 257, which can generate commands that are fed to the power electronics module. The battery enclosure can have an upward slope so that the opening of the battery enclosure tilts slightly upwards (e.g., 10, 15, or 20 degrees), relative to the ground plane, so that gravity helps the battery module slide into place.

Figure 13:
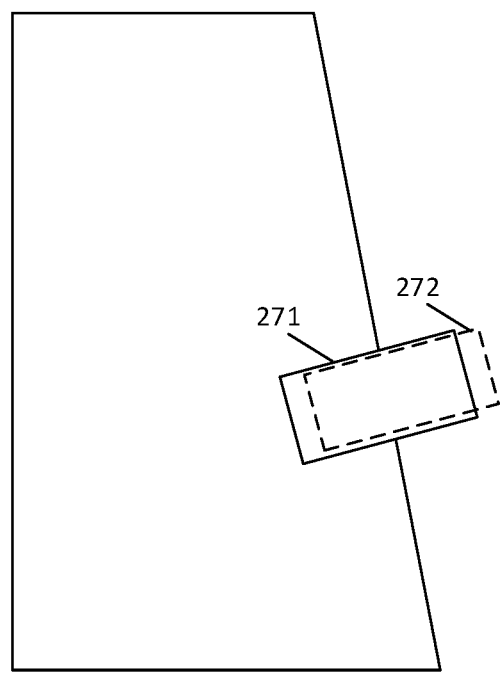
FIG. 13 shows a battery kiosk, according to some embodiments.

In some embodiments, as shown in FIG. 13, the battery enclosure 271 is integral to a kiosk 270. The battery enclosure can be any of the battery enclosures described in other sections of the disclosure (e.g., FIG. 8). A user can insert or remove one or more battery modules 272 from the kiosk. The battery module 272 can be any of the battery modules described in other sections of the disclosure (e.g., in FIG. 1A, 1B). Kiosks can be placed at different locations (e.g., along a route) to provide coverage for electric vehicle users. Users can 'swap' batteries easily by removing a depleted battery module from an electric vehicle (e.g., an electric rickshaw), and replacing it with a charged battery module from the kiosk. The depleted battery can be placed in the kiosk for charging. The battery enclosure can be tilted upwards similar in the kiosk as described with the vehicle.

As discussed, a fan, refrigeration, and/or fluid system (e.g., a pump, fluid reservoir, fluid channels) can be integrated with the electric rickshaw (or other type of electric vehicle) and/or the kiosk to transfer thermal energy to and from the battery enclosure, which in turn transfers thermal energy to and from the battery module.

In some embodiments, as shown in FIG. 8, the battery enclosure includes a vent opening 281 in the battery receptacle. This vent opening aligns to a corresponding vent opening of the battery module, which is described in other sections. The vent opening can include a vent channel 283 and a vent outlet 284 that vents gas from the battery module. The positioning of the outlet can vary depending on application, to direct pressure/heat from the battery module in a controlled manner.

In some embodiments, when the battery enclosure is integral to an electric vehicle and the vent of the battery enclosure is arranged to vent and direct thermal energy downward towards a ground or towards a side of the electric vehicle. In such a manner, if the battery fails and produces excessive heat, gas and heat can exit the battery module through the vent towards the ground or the side of the vehicle to reduce contact with people.

In some embodiments, when the battery enclosure is integral to a kiosk, the vent of the battery enclosure can be arranged to direct gas and thermal energy downward towards the ground or away from a front side of the kiosk in which the battery module is inserted. In such a manner, if the battery fails and produces thermal energy, the thermal energy can exit the battery module towards the ground or away from the front side of the kiosk to reduce contact with people.

Figure 14:
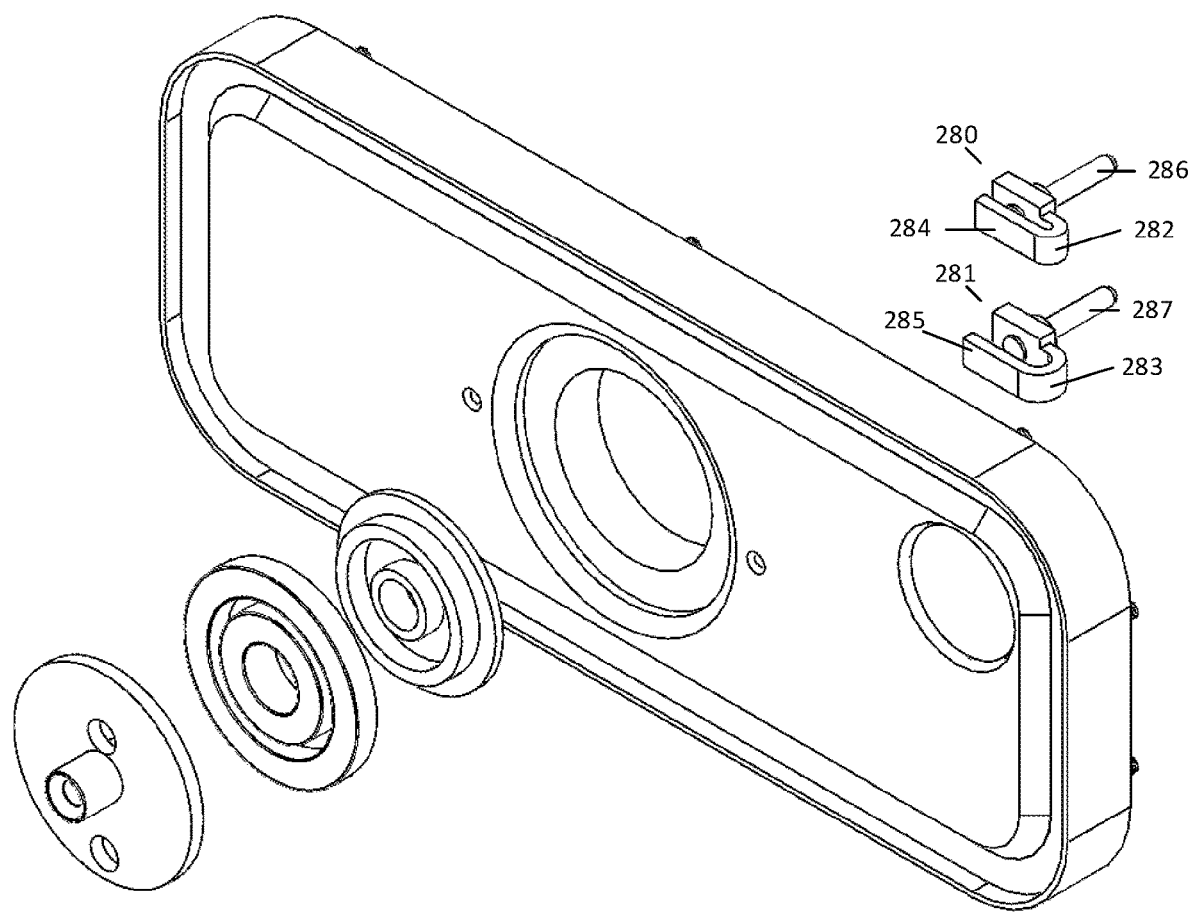
FIG. 14 shows bus bars, according to some embodiments.

FIG. 14 shows bus bars 280 and 281, according to some embodiments. Each bus bar can connect the negative terminal or the positive terminal of the electrical connector (e.g., as shown in FIG. 7A, 7B, 7C) of the battery to a printed circuit board (PCB) that is arranged behind the electric connector in the battery. Each bus bar can have a first portion (284, 285) that has a substantially flat surface for being welded to the electrical connector. The first portion can transition to a U-shaped section (282, 283). At the other end of the U-shaped section, a second portion of the bus bar can hold terminals (286, 287) that are pin or rod shaped. The terminals can have a circular cross section for improved mating. The geometry of the bus bar, with the U-shaped section, provides flexibility that tolerates movement of the terminals, but retains the geometry and positions of the pins, unlike wires and cables. The terminals can mate with sockets that are fixed to the PCB. In such a manner, no wires, crimp terminals, or other hardware would be required, and mating of the PCB to the electrical connector is seamless. The bus bars can be formed from foil layers of a metal such as copper or other suitably flexible and conductive material.

Figure 15:
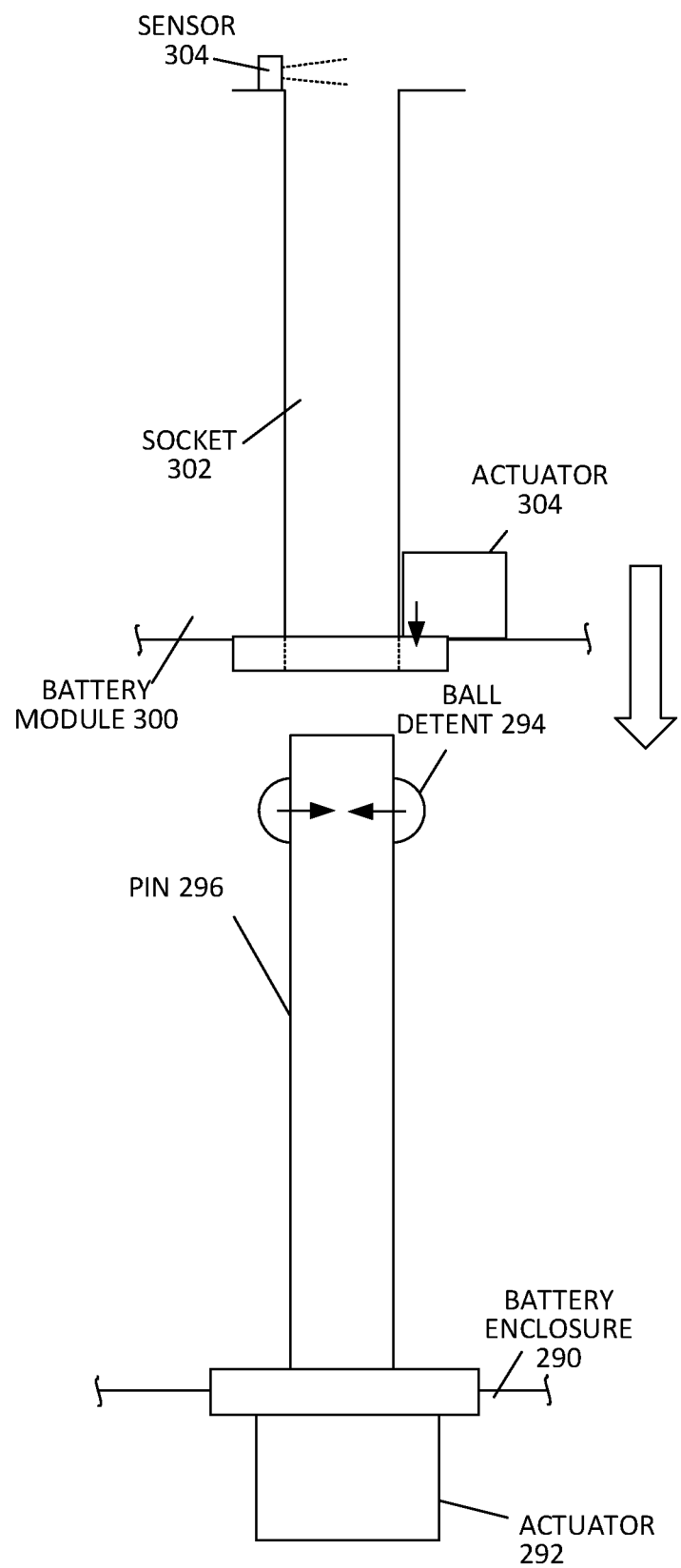
FIG. 15 shows an example of a battery enclosure and battery module, according to some embodiments.

FIG. 15 shows an example battery enclosure and battery module, according to some embodiments. The battery enclosure may mate and lock with a battery module with different locking means, such as by a rotational screw shaft (as shown in FIG. 8) or with a ball detent mechanism as shown in FIG. 15.

In FIG. 15, a pin 296 is fully extended into a socket 302 of battery module 300. A sensor 304, which may be arranged on the battery module or on the battery enclosure, may sense when the pin is inserted in position within the socket, and signal to the actuator 292 to lock the pin in place. The sensor 304 may use light or other sensing technology. The ball detent 294 may be actuated using an actuator 292 which may include a mechanical or electro-mechanical means (solenoid for instance) thereby locking the pin within the battery module 300. Further, once locked together through the pin and socket, a second actuator 304 having a mechanical or electro-mechanical mechanism may pull or push the battery module 300 further towards the battery enclosure 290 to secure an electrical and mechanical fit between the battery module and battery enclosure. Pin 296 may take the place of pin 225 as described in other sections. Some components such as the electrical connector and terminals are omitted in FIG. 15 for clarity. A user may control actuator 292 and 304 to lock and release the battery module, for example, through a button. The locking and releasing of the pin and socket provide blind mating of the battery module with the battery holder. The positions of the actuators and sensors may vary.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, a thermal connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A battery holder, comprising:
    a negative electric terminal that includes a first coiled spring;
    a positive electric terminal that includes a second coiled spring, wherein the first coiled spring and the second coiled spring are ring-shaped, and the first coiled spring encloses the second coiled spring or the second coiled spring encloses the first coiled spring; and
    a pin that aligns mating of the negative electric terminal and mating of the positive electric terminal to a battery module.

2. The battery holder of claim 1, wherein the first coiled spring and the second coiled spring are fixed along their respective lengths to a surface inside the battery holder.

3. The battery holder of claim 1, wherein the pin is enclosed by the ring-shaped second coiled spring.

4. The battery holder of claim 1, wherein the pin is a threaded pin.

5. The battery holder of claim 4, wherein the pin rotates to pull the battery module towards the negative electric terminal and the positive electric terminal.

6. The battery holder of claim 5, wherein the pin is locked into position upon mating.

7. The battery holder of claim 1, including a vent opening that aligns to a second vent opening of the battery module when the battery module is deposited within the battery holder.

8. The battery holder of claim 1, wherein the battery holder includes:
    an opening that is opposite of the positive electric terminal, the negative electric terminal, and the pin; and a plurality of walls to enclose and guide the battery module through the opening to the positive electric terminal, the negative electric terminal, and the pin such that the battery module and the battery holder electrically connect in a blind-mating connection.

9. The battery holder of claim 1, wherein the battery holder is integral to an electric vehicle.

10. The battery holder of claim 1, wherein the battery holder is integral to a kiosk.

11. A battery module comprising:
    a plurality of rechargeable cells;
    a front portion of the battery module includes a handle; and
    a rear portion of the battery module includes a) a pin-less negative terminal having a conductive surface in the form of a first ring, and b) a pin-less positive terminal having a conductive surface in the form of a second ring, and c) an alignment socket which aligns the pin-less negative terminal and the pin-less positive terminal to a mating electrical connector, wherein the second ring is enclosed within the first ring or the first ring is enclosed within the second ring, forming concentric rings, and the alignment socket is enclosed within the concentric rings.

12. The battery module of claim 11, wherein the alignment socket is threaded.

13. The battery module of claim 11, further comprising a thermally conductive housing that houses the plurality of rechargeable cells.

14. The battery module of claim 11, wherein a rear portion of the battery module includes a vent opening with a filtering membrane that allows passing of gas but not solid material.

15. The battery module of claim 11, further comprising a first bus bar and a second bus bar each having a first portion that connects to the pin-less positive terminal or the pin-less negative terminal, respectively, the first portion transitioning to a U-shaped portion that transitions to a second portion, wherein the second portion mates with a printed circuit board (PCB) located within the battery module behind an electrical connector formed by the positive terminal and the negative terminal.

16. A battery holder, comprising:
    a negative electric terminal that includes a first coiled spring;
    a positive electric terminal that includes a second coiled spring; and
    a threaded pin that aligns mating of the negative electric terminal and mating of the positive electric terminal to a battery module, wherein the threaded pin rotates to pull the battery module towards the negative electric terminal and the positive electric terminal.

17. The battery holder of claim 16, wherein the first coiled spring and the second coiled spring are fixed along their respective lengths to a surface inside the battery holder.

18. The battery holder of claim 16, wherein the battery holder includes:
    an opening that is opposite of the positive electric terminal, the negative electric terminal, and the threaded pin; and
    a plurality of walls to enclose and guide the battery module through the opening to the positive electric terminal, the negative electric terminal, and the threaded pin, wherein the battery module and the battery holder electrically connect in a blind-mating connection.

* * * * *